United States Patent
Jaimee

[15] 3,638,625
[45] Feb. 1, 1972

[54] EXHAUST MANIFOLD HEAT VALVE CONTROL SYSTEM

[72] Inventor: Angelo Jaimee, Union Lake, Mich.
[73] Assignee: Ford Motor Company, Dearborn, Mich.
[22] Filed: June 23, 1969
[21] Appl. No.: 835,369

[52] U.S. Cl. ................................. 123/122 H, 123/122 AA
[51] Int. Cl. ............................................................ F02m 31/00
[58] Field of Search .................. 123/122 H, 119 A, 117.1

[56] References Cited

UNITED STATES PATENTS

| Re.18,052 | 4/1931 | Molony | 123/122 |
|---|---|---|---|
| 3,447,518 | 5/1969 | Walker | 1/117.1 |
| 1,686,199 | 10/1928 | Bowman | 123/122 |
| 1,790,469 | 1/1931 | Hans | 123/122 |
| 1,821,047 | 9/1931 | Wright | 123/122 |
| 1,853,623 | 4/1932 | Kirby | 123/122 |
| 1,944,396 | 1/1934 | Berry | 123/122 |
| 2,289,635 | 7/1942 | Edelen | 123/122 |

Primary Examiner—Laurence M. Goodridge
Assistant Examiner—Ronald B. Cox
Attorney—John R. Faulkner and Roger E. Erickson

[57] ABSTRACT

An exhaust heat valve control system for an internal combustion engine in which the position of the heat valve is dependent on the carburetor flange temperature. A temperature responsive bimetal valve opens and closes a vent to a vacuum chamber in response to the carburetor flange temperature. A vacuum motor connected to the vacuum chamber displaces the exhaust heat valve in response to variations in the vacuum chamber pressures.

2 Claims, 3 Drawing Figures

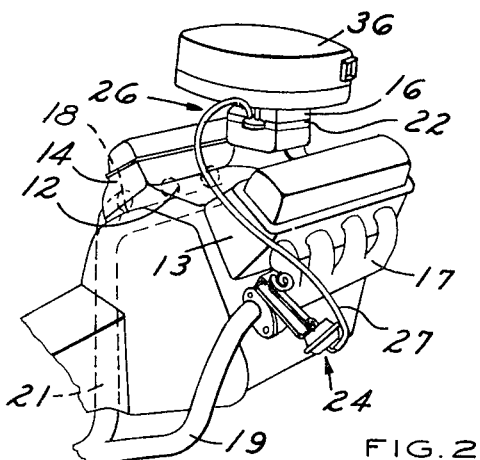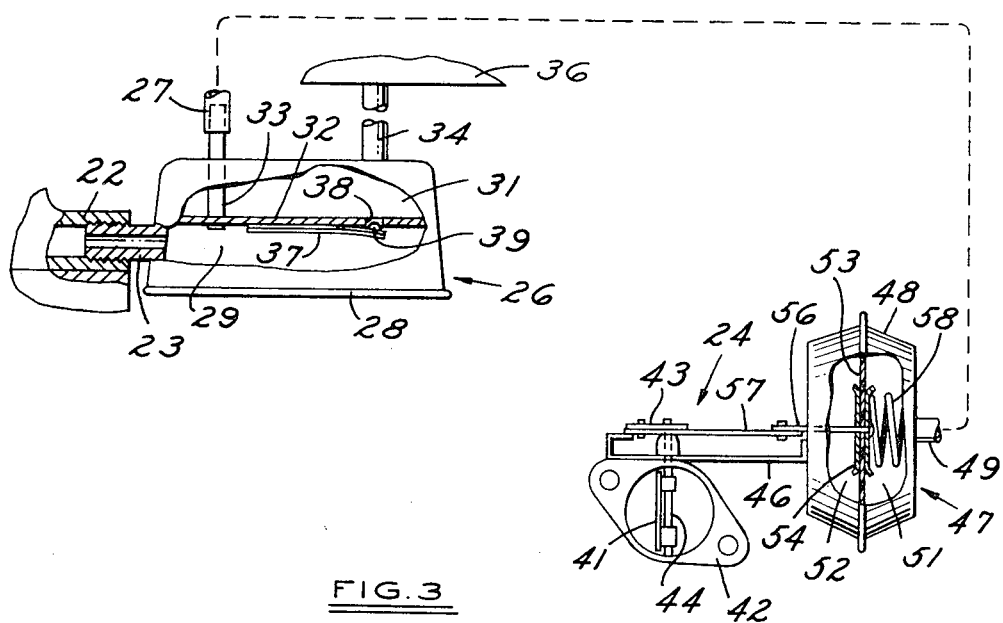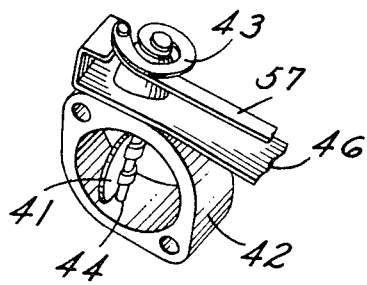

EXHAUST MANIFOLD HEAT VALVE CONTROL SYSTEM

SUMMARY OF THE INVENTION

Exhaust and intake manifolds are often cooperatively designed so that the heat of the exhaust gases can be used to preheat the air-fuel mixture passing through the intake manifold. In such designs the intake manifold has a passage into which exhaust gases are diverted before being discharged into the exhaust pipe means. A heat control valve is one device which can determine whether the exhaust gases will be discharged directly through the exhaust manifold or whether they will be at least partially diverted through the intake manifold so as to transfer a portion of their heat to the incoming induction mixture.

An exhaust heat valve is conventionally controlled by a bimetal spring mounted on or adjacent to the exhaust manifold and is thus responsive to the temperature of the exhaust manifold.

This invention proposes an exhaust heat valve control system responsive to temperatures adjacent the carburetor flange or the intake manifold. This system has the advantage of keeping the carburetor flange temperature more nearly constant, thus reducing undesirable variations in fuel-air ratios.

An engine carburetor experiences variations in temperatures which are not experienced by the exhaust manifold. For example, at road speed the air rushing through the carburetor has a refrigerating effect on the carburetor, thus affecting the fuel-air ratio and making it desirable at times to add heat to the intake manifold. This invention provides a heat valve control system which reduces the carburetor temperature range during engine operation.

This invention further provides a heat valve control system which reduces engine emissions, increases engine efficiency and is economical to produce and maintain.

BRIEF DESCRIPTION OF THE DRAWINGS

FIG. 1 is a perspective view of the invention installed in a V-8 internal combustion engine.

FIG. 2 is an elevational view partly in cross section of the bimetal valve and the vacuum motor and the exhaust heat valve of the invention.

FIG. 3 is a perspective view of the exhaust heat valve showing the connection between the vacuum motor and the exhaust heat valve.

DETAILED DESCRIPTION OF A PREFERRED EMBODIMENT

FIG. 1 illustrates a V-8 internal combustion engine which includes a preferred embodiment of the invention. An intake manifold 12 is positioned between the right and left cylinder heads 13 and 14 and delivers an air-fuel mixture from the carburetor 16 to the cylinder heads. The intake manifold 12 includes an exhaust crossover passage (not shown) which interconnects selected exhaust ports of cylinder heads 13 and 14 and routes hot exhaust gases under certain conditions under the carburetor heat riser bores (not shown) so as to warm the incoming air-fuel mixture from the carburetor 16. Right and left exhaust manifolds 17 and 18 are located on the exterior sides of the cylinder heads 13 and 14, respectively, and interconnect the exhaust ports of heads 13 and 14 with exhaust pipes 19 and 21, respectively.

The carburetor 16 is separated from the intake manifold 12 by a spacer 22 which forms a portion of the induction passage. The spacer is located downstream of the carburetor throttle valve and thus experiences essentially intake manifold vacuum pressure. A threaded passage means 23 (shown in FIG. 2) extends from the interior of the spacer to its exterior.

In addition to the conventional engine components described above, the invention includes a vacuum controlled exhaust heat valve assembly 24, a bimetallic vent valve assembly 26 and passage means 27 interconnecting the two assemblies 24 and 26.

The vent valve assembly 26 includes a sealed housing 28 divided into two compartments 29 and 31 by a partition wall 32. The lower compartment 29 is in communication with the vacuum in the intake manifold 12 via threaded passage means 23. A second passage means 33 leads from the interior of the lower compartment 29 to the exterior of the housing. A third passage means 34 leads from the interior of the upper compartment 31 to substantially atmospheric pressure within the interior of the air cleaner 36. A bimetallic element 37 is connected to the partition 32 adjacent a port 38 formed in the partition. A generally spherically shaped bead 39 positioned at the end of the bimetallic element 37 functions as a valve member to open and close the port 38 in partition 32.

The exhaust heat valve assembly 24, shown in detail in FIGS. 2 and 3, comprises a butterfly valve 41 pivotally mounted within a segment 42 of the exhaust passage between the outlet of exhaust manifold 17 and the inlet of exhaust pipe means 19. A spiral-shaped lever arm 43 is positioned on an end portion of a pivot rod 44 extending through the wall of the segment 42. A bracket 46 interconnects the segment 42 and a vacuum motor 47.

The vacuum motor 47 includes a housing 48 having a tubular port 49 formed in one end. The interior of the housing is partitioned into two chambers 51 and 52 by a flexible diaphragm 53. Chamber 52 is vented to the atmosphere. Metal plates 54 are secured to the central portion of the diaphragm 53 and have a rigid arm 56 extending perpendicularly therefrom out of the vacuum motor housing 48 toward the exhaust heat valve. A second arm 57 is pin jointed to the arm 56 and interconnects it and the lever arm 43 of the exhaust valve. A compression spring 58 is mounted within the housing 48 that tends to increase the volume of vacuum chamber 51 and to close the butterfly valve 41. A flexible tube 27 interconnects the port 49 and the tubular passage 33 of the bimetal valve assembly, thus constantly communicating the lower compartment 29 of the bimetal valve assembly with chamber 51 of the vacuum motor 47.

Installation of the invention on a 6-cylinder engine would be similar to that described above; however, in an in-line six, the heat valve is positioned within the exhaust manifold and diverts a portion of the hot exhaust gases around the valve upwardly into and through a heat transfer chamber formed within the intake manifold. The exhaust gases return from the intake manifold to the exhaust manifold on the opposite side of the heat valve and are discharged into the exhaust pipe means. For example, see U.S. Pat. No, 1,986,542. Aside from the basic differences of the conventional installation of exhaust heat valves in V-type versus in-line engines, the principles of operation of the invention installed in either type of engine are identical with those described in the following paragraphs.

OPERATION

The exhaust heat valve control system described in the foregoing paragraphs functions to open and close the exhaust heat valve in direct response to the engine temperatures adjacent the carburetor flange.

When the carburetor flange temperature is cold, the bimetallic element 37 assumes a nearly straight configuration and bead 39 closes port 38 of the partition 32. With port 38 so closed, the manifold vacuum from the interior of the carburetor spacer 22 is communicated through assembly 26 to the passage means 27 with no substantial reduction in vacuum pressure. Passage means 27 connects to port 49, whereby chamber 51 also experiences vacuum pressure and assumes a minimum volume position in which spring 58 is compressed and arm 56 is withdrawn into the housing 48. The withdrawal of arm 56 causes the butterfly valve 41 to close, thereby blocking the outlet to the right exhaust manifold 17. The right bank exhaust gases are then routed through the crossover passage of intake manifold 12 and exhaust heat is given up to the carburetor riser bores of the intake manifold and transferred to the incoming air-fuel mixture. The right bank exhaust gases then pass from the intake manifold 12 through the left cylinder head 14 and into the left exhaust manifold 18.

As the flange of carburetor 16 begins to warm, the bimetal element 37 begins to bow causing bead 39 to progressively open port 38. Opening port 38 bleeds the vacuum in passage 27 to substantially atmospheric pressure within chamber 51. Spring 58 expands causing arm 56 to move outwardly from housing 48 and to progressively open the butterfly valve 41. When the butterfly valve is completely opened, the exhaust gases of the right bank of the engine discharge directly through the right exhaust manifold 17 into exhaust pipe 19. Heat transfer from the intake manifold 12 to the induction air-fuel mixture is reduced accordingly.

The foregoing description presents the presently preferred embodiment of the invention. Modifications and alterations will occur to those skilled in the art which are included in the scope and the spirit of the invention.

I claim:

1. In an internal combustion engine having a carburetor, an air cleaner filtering the air prior to entry into the carburetor, intake manifold means receiving an air-fuel mixture from said carburetor, cylinder head means receiving said mixture from said intake manifold, exhaust manifold means receiving hot exhaust gases from said cylinder head means, said intake manifold including a portion in communication with said exhaust manifold means, and exhaust heat valve means connected to said exhaust manifold means constructed to divert a portion of the hot exhaust gases from a portion of the exhaust manifold means to the intake manifold means to heat the incoming air-fuel mixture, said heat valve means including a pivotally mounted butterfly plate which opens and closes a portion of said exhaust manifold means, vacuum motor means having a movable portion connected to said butterfly plate, first passage means communicating the vacuum motor means with a source of vacuum pressure, second passage means communicating said first passage means with the interior of said air cleaner, bimetallic valve means in said second passage means adjacent said carburetor and said intake manifold, said bimetallic valve means including a movable portion constructed to open and close said second passage means in response to carburetor temperature.

2. In an internal combustion engine having a carburetor, intake manifold means receiving an air-fuel mixture from said carburetor, cylinder head means receiving said mixture from said intake manifold exhaust passage means including exhaust manifold means receiving and transporting hot exhaust gases from said cylinder head means, said intake manifold including a portion in communication with said exhaust manifold means, and exhaust heat valve means in said exhaust passage means constructed to divert a portion of the hot exhaust gases from a portion of the exhaust manifold means to the intake manifold means to heat the incoming air-fuel mixture, said heat control valve means including a pivotally mounted butterfly plate to open and close a portion of said exhaust passage means, vacuum motor means having a spring biased movable portion connected to said butterfly valve, first passage means communicating the intake manifold adjacent said carburetor and said vacuum motor means, second passage means communicating said atmospheric air compartment with the interior of said air cleaner assembly, vacuum control means adjacent said carburetor and intake manifold comprising a housing having a vacuum compartment and an atmospheric air compartment, said vacuum compartment comprising a portion of said first passage means, a bleed vent between said compartments, temperature responsive valve means within said vacuum compartment movable in response to changes in carburetor and intake manifold temperatures, said valve means comprising a bimetal element secured at one end to a wall of said compartment and at the other end having a bead, said bead received within and restricting said bleed vent during engine warmup temperatures, said bead being removed from said bleed vent during normal operating temperatures of said engine, whereby the removal of the bead from said bleed vent decreases the vacuum pressure acting on the vacuum motor causing the heat control valve means to open and reduce the heating effect of exhaust gases on the intake manifold.

* * * * *